Jan. 26, 1965  R. A. WATERS  3,167,735
POTENTIOMETER
Filed March 27, 1961

INVENTOR.
Robert A. Waters
By: Stone, Nieman, Burmeister & Zummer
Attys

United States Patent Office 3,167,735
Patented Jan. 26, 1965

3,167,735
POTENTIOMETER
Robert A. Waters, Weston, Mass., assignor to Waters Manufacturing, Inc., Wayland, Mass., a corporation of Massachusetts
Filed Mar. 27, 1961, Ser. No. 98,445
6 Claims. (Cl. 338—89)

This invention relates to potentiometers (including rheostats) and more particularly to rotary potentiometers of the type of construction in which the resistance element is not disposed circularly about the axis of rotation of the moving contact.

There are various forms of rotary potentiometer in which the resistance element is in a form other than a circle or arc having its center at the axis of rotation of the movable wiper contact, as is the case in conventional potentiometers. Various forms of non-circular or eccentric resistance elements may be used, particularly in so-called "function" potentiometers, designed to produce a voltage or resistance at the wiper which is some function of the angle of shaft disposition other than merely proportional. As one example, for certain types of analog computing used in automatic navigation, a square resistance element may be used with a wiper axis of rotation at its center to produce a voltage output which is the desired trigonometric function of the angle of the wiper shaft.

It has been discovered that the employment of a conventional wiper or contact construction on this type of potentiometer introduces a limitation on the precision of the instrument in accomplishing its desired purpose. In theory, it may be considered that a wiper makes contact with a resistance element solely at a point, rather than over an area. Mere cursory examination of a modern precision potentiometer would appear to indicate that this theoretical point contact is substantially met in practice. In fact, however, when precision measurements are made, it is found that the necessarily finite dimensions of the areas of contact of both the wiper and the resistance element produce shorting of the portion of the length of the resistance element corresponding to the width of the contacting surface of the wiper. In the case of a circular potentiometer, since the number of shorted turns (in the case of the usual wire-wound potentiometer) is constant with rotation, no substantial error is introduced. It has, however, been found that the error of variation in shorted turns may not be neglected in a function potentiometer formed as described above, since in this case the number of shorted turns of an element of uniform winding pitch or turns spacing varies, for any given contact width, with the angle between the resistance element and the finite-width contacting surface at the point of contact.

The present invention, based on the finding above, holds constant the number of turns of such a resistance element which are shorted by the contact by varying the width (dimension transverse to the rotational radius) of the contact surface with distance from the rotational axis in accordance with the angle formed at the point of contact between the rotational radius and the resistance element. In the embodiment to be described, the resistance element is disposed in a straight line. It will be seen upon study that with such a linear element, the length portion of the resistance element which is contacted by a rotary contact of uniform width will increase with departure from perpendicularity in the angle which the contact makes with the element. It may be shown by calculation that this effect may be compensated by reducing the width of the contact in inverse proportion to the distance of any portion of the contacting surface from the axis of rotation. However, in order to obtain the desired result of eliminating this effect as a limit on the accuracy of the potentiometer, it is not required, particularly with wire-wound potentiometers, that this perfect relation be accurately maintained, since the fineness of the wire windings is itself a limitation on the ultimate precision, so that only the degree of contact taper required to prevent substantial change in the number of shorted turns is required.

The desired taper may be achieved in an extremely inexpensive and simple manner by forming the contact surface of the wiper from a strip of material by bending the edges away from the plane of the strip, the degree of bending varying in a manner to produce the desired tapered contacting surface. If the bending is accomplished by, for example, striking the center of the tip of the strip, using an appropriate jig or fixture, the cross section of the strip will assume the shape of a V of gradually decreasing sharpness at points remote from the end, the tapered contacting surface thus formed finally blending into the plane of the strip at some point radially inward of the minimum distance of the resistance element from the axis of rotation.

For more complete understanding of the invention, reference is made to the embodiments illustrated in the attached drawing, in which.

Figure 1:
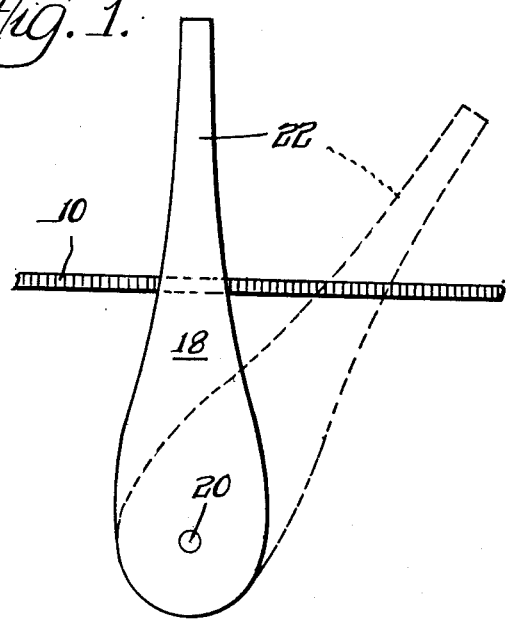
FIGURE 1 is a more or less schematic fragmentary plan view of a potentiometer embodying the invention.
Figure 2:
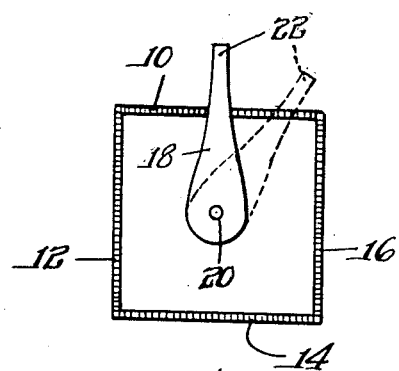
FIGURE 2 is a view of the device of FIGURE 1 showing in schematic form additional portions of the potentiometer.
Figure 3:
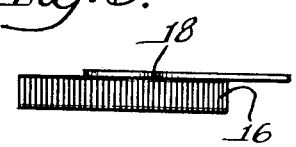
FIGURE 3 is a side elevation of the potentiometer of FIGURE 2.

The more or less schematic presentation of FIGURES 1 through 3 shows a potentiometer having resistance elements 10, 12, 14, and 16, disposed in the form of a square, each being linear. The rotating wiper contact or tap 18 is mounted on an axis of rotation shown at 20. In the position of the wiper 18 illustrated, the angle between the resistance element 10 and the wiper 18 is a right angle, the region of contact in this condition defining the innermost end of the transversely flat contacting surface of the wiper. When the wiper is rotated about its axis, as shown by the dotted indication, the contacted portion of the contacting surface of the wiper moves outward, and at the same time the angle of intersection with the resistance element 10 is altered in a direction such that the length portion of the resistance element which is in contact with the wiper would increase if the wiper were of constant width. However, the contacting portion 22 of the wiper is tapered in width to hold this shorted length of the resistance element constant. Obviously, the shaping of the wiper radially inward from the minimum effective radial distance from the center 20 is immaterial. However, the outer or contacting portion 22 is so shaped that its width at any point is approximately inversely proportional to the distance of that point from the rotating center 20. With this construction, the shorted length of the resistance element 10 which is produced by the wiper remains substantially constant.

The illustration of FIGURES 1 through 3 is of course highly schematic and exaggerated, since a modern precision potentiometer would in general not be designed in such a manner as to produce the shorting of as large a number of turns as is illustrated in the drawing. In actual practice, as is well understood by those skilled in the art, both the width of the actual contact area and the dimensions of the individual turns of resistance wire as used in present-day precision potentiometers are so small compared to the other dimensions involved as to be incapable of clear illustration without exaggeration.

In the square potentiometer of FIGURE 2, the maximum angle of intersection is 45°, thus producing (assuming negligible contact area thickness, i.e., line contact on the resistance element itself) approximately a factor of 1.4 as the increase in shorted length of the resistance element in the absence of taper. Where the number of shorted turns is very small in the perpendicular position, as in a modern potentiometer, the tapering need not exactly follow the inverse proportion mentioned above, since even a rough approximation of this form of taper will produce the desired result of eliminating this variation in shorted turns as the limiting factor in the precision. For substantially larger angles (not obtained, of course, in a square potentiometer), the degree of taper of course becomes more critical.

Figure 4:
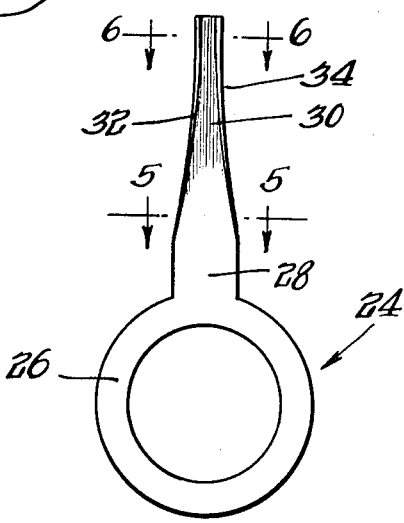
FIGURE 4 is a plan view of a modified form of wiper contact which may be employed in accordance with the invention.
Figure 6:
FIGURE 6 is a sectional view taken along the line 6—6 of FIGURE 4.
Figure 5:
FIGURE 5 is a sectional view taken along the line 5—5 of FIGURE 4.

There is shown in FIGURE 4 a practical form of contact for use in the type of potentiometer schematically indicated in the previous figures. As therein shown, the rotatable contact 24, designed for suitable mounting (not illustrated) on a potentiometer shaft, is formed of a resilient material such as phosphor bronze, and has a ringed portion 26 with an integral contact arm 28 of which the outer end 30 constitutes the contacting portion. The sides or edges 32 and 34 are bent upwardly to form the desired tapered contacting portion 30, as illustrated in FIGURES 5 and 6. This is achieved in a simple way by striking the center of the tip to form a fairly sharp V as shown in FIGURE 6, the deformation thus formed distributing itself naturally in the desired tapered pattern.

Obviously, many modifications of the illustrated structures will be made by persons skilled in the art. Accordingly, the scope of the invention shall be deemed to be limited only by the appended claims.

What is claimed is:

1. In a potentiometer comprising a wire-wound resistance element of uniform turns spacing and a contact member mounted for rotation about an axis at differing distances from portions of the resistance element and having a contacting surface successively engaging the resistance element at differing distances from the axis, the angle between the direction of extension of the contact member and the direction of extension of the portion of the resistance element contacted varying at such distances, the improved construction wherein the width of the contacting surface is different at differing distances from the axis, the width of successive portions of the contacting surface having such relation to the angle formed upon its engagement of the resistance element that the contacted length portion of the resistance element remains substantially constant.

2. The potentiometer of claim 1 wherein the resistance element extends along a straight line, the contact member comprising a flat strip having a contacting portion formed in the cross-sectional shape of a V of sharpness increasing with radial distance from the axis.

3. A potentiometer comprising:
   (a) a wire-wound resistance element of substantially constant turns spacing,
   (b) a wiper member having a mounting portion and extending outwardly to a contacting surface portion,
   (c) means for supporting and moving the mounting portion to drive the contacting surface portion for contacting of successive portions of the element,
   (d) the contacting surface portion engaging the element at varying distances from the mounting portion and at correspondingly varying angles,
   (e) the contacting surface portion being of a width varying with distance from the mounting portion,
   (f) the width decreasing with increasing deviation, and increasing with decreasing deviation, from perpendicularity between the direction of extension of the wiper and the portion of the element contacted thereby,
   (g) the relation of the width and angle maintaining the number of turns of the element shorted by the wiper substantially constant.

4. The potentiometer of claim 3 wherein the motion of the wiper member is rotary and the resistance element extends along a straight line, the width of the contacting member decreasing with increasing distance from the rotary axis.

5. The potentiometer of claim 4 wherein the width of the contacting surface portion is substantially inversely proportional to the distance from the axis.

6. The potentiometer of claim 3 wherein the wiper member comprises a flat strip having the edges bent away from the plane of the strip at varying distances from the center-line thereof.

References Cited by the Examiner
UNITED STATES PATENTS

| | | | |
|---|---|---|---|
| 988,456 | 4/11 | Gernsback | 338—89 X |
| 2,525,095 | 10/50 | Coxon et al. | 338—167 X |
| 2,918,642 | 12/59 | Webster et al. | 338—89 |

RICHARD M. WOOD, Primary Examiner.

MARCUS U. LYONS, Examiner.